United States Patent
Prasad et al.

(10) Patent No.: US 9,152,465 B2
(45) Date of Patent: Oct. 6, 2015

(54) PRIORITZED BRANCH COMPUTING SYSTEM

(75) Inventors: Chandrodaya Prasad, Santa Clara, CA (US); Huseni Saboowala, Fremont, CA (US); Anand Oswal, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 13/589,952

(22) Filed: Aug. 20, 2012

(65) Prior Publication Data
US 2014/0052837 A1 Feb. 20, 2014

(51) Int. Cl.
| | |
|---|---|
| G06F 15/173 | (2006.01) |
| G06F 9/50 | (2006.01) |
| H04L 29/08 | (2006.01) |
| H04L 12/24 | (2006.01) |
| G06F 11/34 | (2006.01) |

(52) U.S. Cl.
CPC .......... *G06F 9/5027* (2013.01); *G06F 11/3409* (2013.01); *G06F 11/3495* (2013.01); *H04L 41/5009* (2013.01); *H04L 41/5051* (2013.01); *H04L 67/1008* (2013.01); *G06F 2209/501* (2013.01)

(58) Field of Classification Search
CPC .................................................... G06F 15/173
USPC .................................. 709/217, 220, 223, 230
See application file for complete search history.

(56) References Cited

U.S. PATENT DOCUMENTS

| | | | |
|---|---|---|---|
| 2013/0060933 A1* | 3/2013 | Tung et al. ..................... | 709/224 |
| 2013/0124669 A1* | 5/2013 | Anderson et al. ............. | 709/217 |

* cited by examiner

*Primary Examiner* — Joseph E Avellino
*Assistant Examiner* — Marshall McLeod

(57) ABSTRACT

A branch device that may be operable to: request to initiate access to a cloud computing application; map or link service level agreement information associated with the cloud computing application to performance and uptime specifications associated with a policy engine; and communicate with a first computational node that runs a first instance of the cloud computing application. Also, the branch device may be operable to: compare the performance data and the uptime data retrieved from the first computational node against the specifications, respectively; direct a request to the first instance, where the performance data and the uptime data at least satisfies the specifications, respectively; and direct a request to a second instance of the cloud computing application running on a second computational node, where the performance data and the uptime data do not satisfy the specifications, respectively.

20 Claims, 5 Drawing Sheets

PRIORITZED BRANCH COMPUTING SYSTEM

FIELD

The present disclosure relates generally to cloud computing.

BACKGROUND

Cloud computing refers to providing computing and electronic storage as a service to a group of end-users. Typically, end-users access cloud computing based applications through a web browser, a remote or lightweight desktop, or a mobile application. In general, cloud computing provides computer implemented services while storing and executing a user's data and software over a network. A common embodiment of cloud computing is software as a service (SaaS).

A benefit of cloud computing includes running processor-intensive applications from a remote server that has more processing power than a typical client device. Also, cloud computing provides for improved manageability of software, since the software can be managed at one computational node of a network as opposed to managing it at multiple end-user client devices. This is especially useful considering fluctuation and specialization of software today.

In short, cloud computing takes advantage of sharing resources to achieve consistency and economies of scale over a network.

DESCRIPTION OF EXAMPLE EMBODIMENTS

Overview

Figure 1:
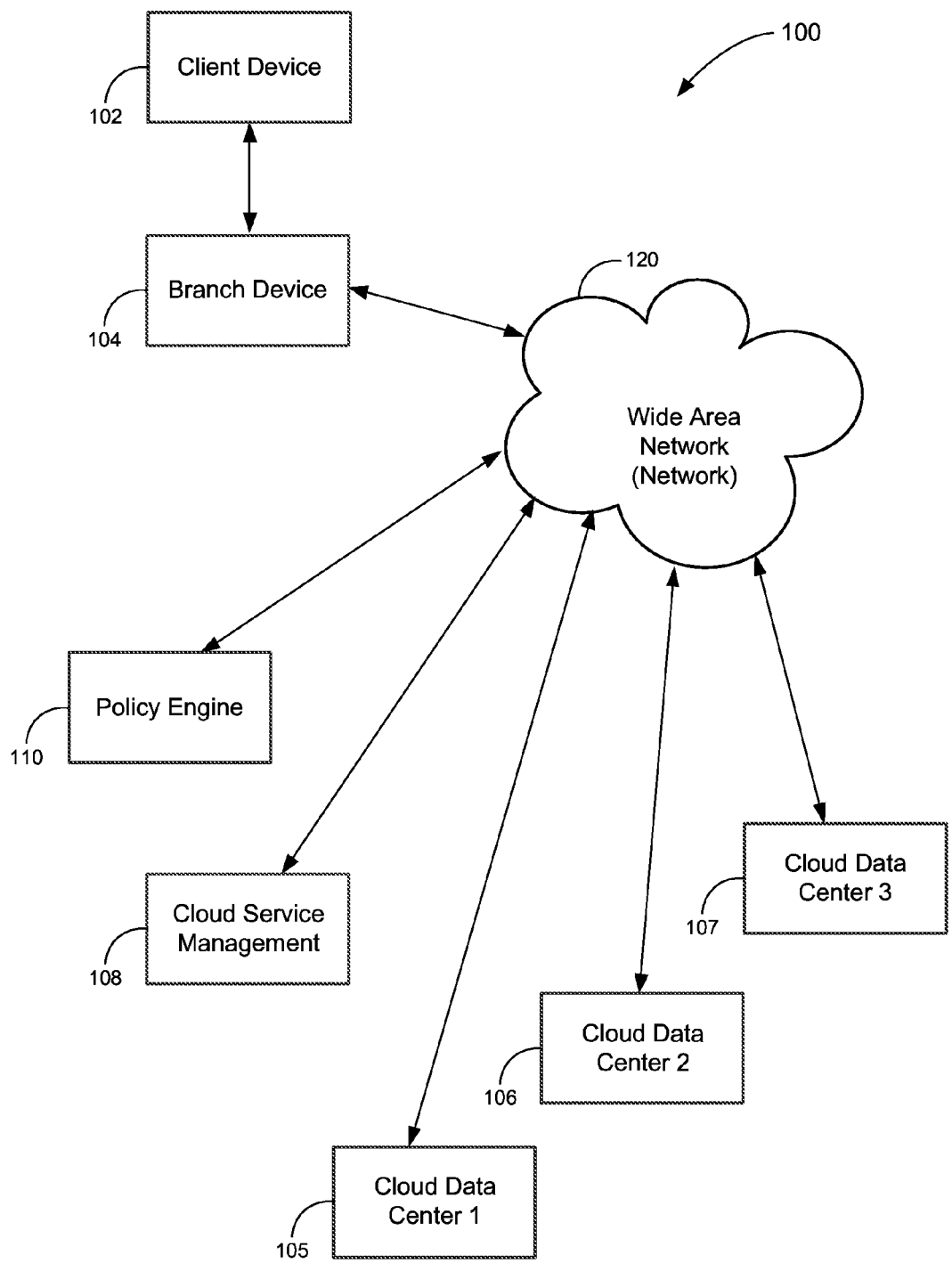
FIG. 1 illustrates a block diagram of an example cloud computing environment.

In one embodiment, a branch device for prioritizing cloud computing may be operable to: receive, via a transceiver of the branch device, a request to initiate access to a cloud computing application, from a client device; map or link, via a control plane of the branch device, service level agreement information associated with the cloud computing application to performance and uptime specifications associated with a policy engine; and communicate with a first computational node that runs a first instance of the cloud computing application, via the transceiver of the branch device. The communications with the first computational node comprise: a request for performance data and uptime data, from the branch device to the first computational node; and a response to the request containing the performance data and the uptime data, from the first computational node to the branch device.

Furthermore, the branch device may be further operable to: compare the performance data and the uptime data against the performance specifications and the uptime specifications, respectively; direct a request from the client device to the first instance of the cloud computing application, where the performance data and the uptime data at least satisfies the performance specifications and the uptime specifications, respectively; and direct a request from the client device to a second instance of the cloud computing application running on a second computational node, where the performance data and the uptime data do not satisfy the performance specifications and the uptime specifications, respectively.

In one embodiment, a client device, comprising a control device, such as a processor, may be operable to: request to initiate access to a cloud computing application; map or link service level agreement information associated with the cloud computing application to performance and uptime specifications associated with a policy engine; and communicate with a first computational node that runs a first instance of the cloud computing application. The communications with the first computational node comprise: a request for performance data and uptime data, from the client device to the first computational node; and a response to the request containing the performance data and the uptime data, from the first computational node to the client device. Also, the client device may be operable to: compare the performance data and the uptime data against the performance specifications and the uptime specifications, respectively; direct a request to the first instance of the cloud computing application running on the first computational node, where the performance data and the uptime data at least satisfy the performance specifications and the uptime specifications; and direct a request to a second instance of the cloud computing application running on a second computational node, where the performance data and the uptime data do not satisfy the performance specifications and the uptime specifications, respectively.

EXAMPLE EMBODIMENTS

Various embodiments described herein can be used alone or in combination with one another. The following detailed description describes only a few of the many possible implementations of the present embodiments. For this reason, this detailed description is intended by way of illustration, and not by way of limitation.

Advances in cloud computing allow for running processing-intensive applications from a remote server that has more processing power than a typical client device. Also, advances have improved manageability of software, since the software can be managed at one computational node of a network as oppose to trying to manage multiple instances of the software at various client devices of the network.

Cloud computing being service oriented, typically includes a server that stores service level agreements (SLAs) regarding cloud computing services and applications. A SLA may include, for example, terms of performance. Terms of performance may include acceptable latency, jitter, amount of drops, or the like, for example. Also included in a SLA may be the uptime. The uptime, for example, may be associated with availability of a cloud computing application. Typically, an acceptable uptime may include 99.999% availability, where the application is only unavailable 0.001% of the time.

Cloud computing applications may be served from a data center (such as, a server hosting a data center) or from a computer available at a branch of a network (such as, a branch router). In the case of serving an application from a branch device, such as a branch router, the branch device may be limited in its processing capabilities. For example, a processor of a branch router typically processes data slower than a processor of a server. However, serving an application from branch router can be faster considering it is typically closer to a client device than a server in a cloud computing environment. Also, in a cloud computing environment, in serving an application, a branch device may communicate directly with a client device. Whereas, in cloud computing, a server may communicate with the client device via a wide area network, a local area network, and finally the branch device, for example (See FIG. 1, where servers of a cloud computing environment are connected with a end-user's client device via a WAN and a branch device).

Therefore, it may be beneficial to serve applications from a branch device in a selective manner, such as prioritized serving of an application; so that the advantage of a branch device's proximity to a client device can be exploited and the burden of a branch device's slower processor may be reduced. Described herein is a prioritized branch computing system (PBCS) that may, among other things, provide such functionality.

Per end-user, type of end-user, role of end-user, or group of end-users (such as, engineers, support staff, or executives), an aspect of a cloud computing environment, for example, may link or map SLA information to performance and uptime specifications associated with a policy engine when an end-user of the cloud computing environment initiates access to a cloud computing application. Another aspect of the cloud computing environment (such as, a data center hosted by a server) may store the SLA information. Also, another aspect of the cloud computing environment may store and execute the policy engine. For example, a computational node, such as a server may store and execute the policy engine.

A branch device of a cloud computing environment, such as a branch router, associated with a client device of the end-user, may probe (such as, using a network performance manager) an aspect of the cloud computing environment that stores the SLA information and/or an aspect of the cloud computing environment that stores and runs the cloud computing application. The branch device may probe the aspect(s) of the cloud computing environment, such as a cloud computing application server(s) and/or a data center(s), to track performance (such as latency, jitter, drops, or the like) and uptime between itself and the application server(s) and/or the data center(s). The branch device may then analyze performance data and uptime data from the probe.

Besides the probe, the branch device may receive performance data and uptime data with respect to application server(s) and/or a data center(s) from a server running a cloud service management application. For example, the branch device may receive data center availability metrics from the cloud service management application. The data center availability metrics may include processing rate and storage considerations of one or more aspect(s) of the cloud computing environment. For example, the branch device may continually maintain a record of performance and uptime information regarding various aspects of the cloud computing environment.

The branch device may then use the record of performance and uptime information, by comparing such information against the performance specifications and the uptime specifications of the policy engine. For an end-user using a client device accessing the cloud computing application via the branch device for example, whose SLA specifications for the cloud computing application cannot be met by the application server(s) and/or the data center(s) based on the record of performance and uptime information, the branch device redirects requests of the end user's client device to an instance of the cloud computing application running on the branch device or another computational node of the cloud computing environment closer to the client device than the application server(s) and/or the data center(s). Alternatively, the branch device redirects requests of the end user's client device to an instance of the cloud computing application running on another computational node of the cloud computing environment that has acceptable performance and uptime metrics according to the SLA specifications.

FIG. 1 illustrates a block diagram of an example cloud computing environment 100. As shown, FIG. 1, for example, includes a wide area network (WAN) 120 and a variety of devices, such as client device 102, a branch device 104, and a variety of servers, such as a server that includes a policy engine 110, a server that includes cloud service management 108, and servers 105-107 that store data and software useable via the cloud computing environment 100. The WAN 120 may include sub-networks, such as the Internet and/or a private intranet. As shown, in certain example embodiments, end-users may only have access to the cloud computing environment 100 via a client device, such as client device 102. Then via one or more branch device(s), such as the branch device 104, an end-user can access applications provided via the cloud computing environment 100. In one embodiment, not depicted, a client device can access a WAN directly, bypassing a branch device, for example.

Further depicted, the branch device 104 communicates with the servers hosting the policy engine 110, the cloud service management 108, and the cloud data centers and/or cloud application servers 105-107, via the WAN 120. Alternatively or in addition, and not depicted, a branch device or a client device may communicate directly with servers hosting a policy engine and cloud service management, bypassing a WAN. For example, such alternative communications may occur via a local area network (LAN). Furthermore, the branch device 104 may host the policy engine or the policy engine may be distributed amongst multiple nodes of a distributed system.

The cloud computing environment 100 may couple network components so that communications between such components can occur, whether communications are wireline or wireless communications. Wire-line (such as a telephone line or coaxial cable) and wireless connections (such as a satellite link or radio link) can form channels that may include analog lines and digital lines. In communicating across such channels, the cloud computing environment 100 may utilize various protocols and may operate with a larger system of networks.

Alternatively, and not depicted, besides or in addition to interacting in a cloud computing environment or infrastructure, the PBCS can interact in or with various architectures that may include any variety or combination of distributed computing architectures, including, any other service-oriented architecture, a peer-to-peer architecture, and a tightly-coupled architecture, for example. Further, the various nodes of the distributed computing architectures may provide configurations for differing architectures and protocols. For example, a branch device, such as the branch device 104 may provide a link between otherwise separate and independent LANs, and a network switch may connect two or more network components of the distributed architectures. Signaling formats or protocols employed may include, for example, Bluetooth protocols, Fibre Channel network protocols, TCP/IP, UDP, routing protocols, RTPS, SSH, FTP, Telnet, HTTP, HTTPS, SFTP, or SSL.

With respect to a wireless network being part of the architectures, such networks may include a stand-alone, ad-hoc, mesh, Wireless LAN (WLAN), or cellular network. A wireless network, as well as a wireline/wireless network, may include terminals, gateways, switches, routers, call managers, and firewalls coupled by wireless radio links.

Networks and devices of the architectures, such as the cloud computing environment 100, may be or include computational nodes. For example, aspects of the cloud computing environment 100 can enable processing of different aspects of the PBCS on one or more processor(s) located at one or more of the computational node(s). A computational node may be one or more of any electronic device(s) that can perform computations, such as a general-purpose computer, a mainframe computer, a workstation, a desktop computer, a laptop computer, a mobile device, a router, and a switch, for example. In FIG. 1, the computation devices may include any one of the electronic devices 102, 104, 105-107, 108, and 110, and devices within the WAN 120. Also, a computational node can include logic, such as logic that supports the PBCS. In one embodiment, the client device 102, the branch device 104, or a device of the WAN 120 not depicted may include the logic that supports the PBCS. Further, the logic may include or interact with a knowledge base, such as a database. In FIG. 1, the cloud data centers 105-107 may include one or more knowledge base(s).

Computational nodes of the architectures, such as computation nodes of the cloud computing environment 100, may communicate cloud computing application information and commands to other nodes of the architecture, including other computation nodes and knowledge base nodes, or nodes that may include a combination of functionality including computational and knowledge base functionality. One or more of the computational node(s) of the architecture(s) may perform aspects of a method 500, which include aspects of the PBCS. Instructions for performing these aspects of the method 500 may exist in logic described herein, such as the memory 204, another memory device, another type of hardware, software, firmware, or a combination thereof.

Figure 2:
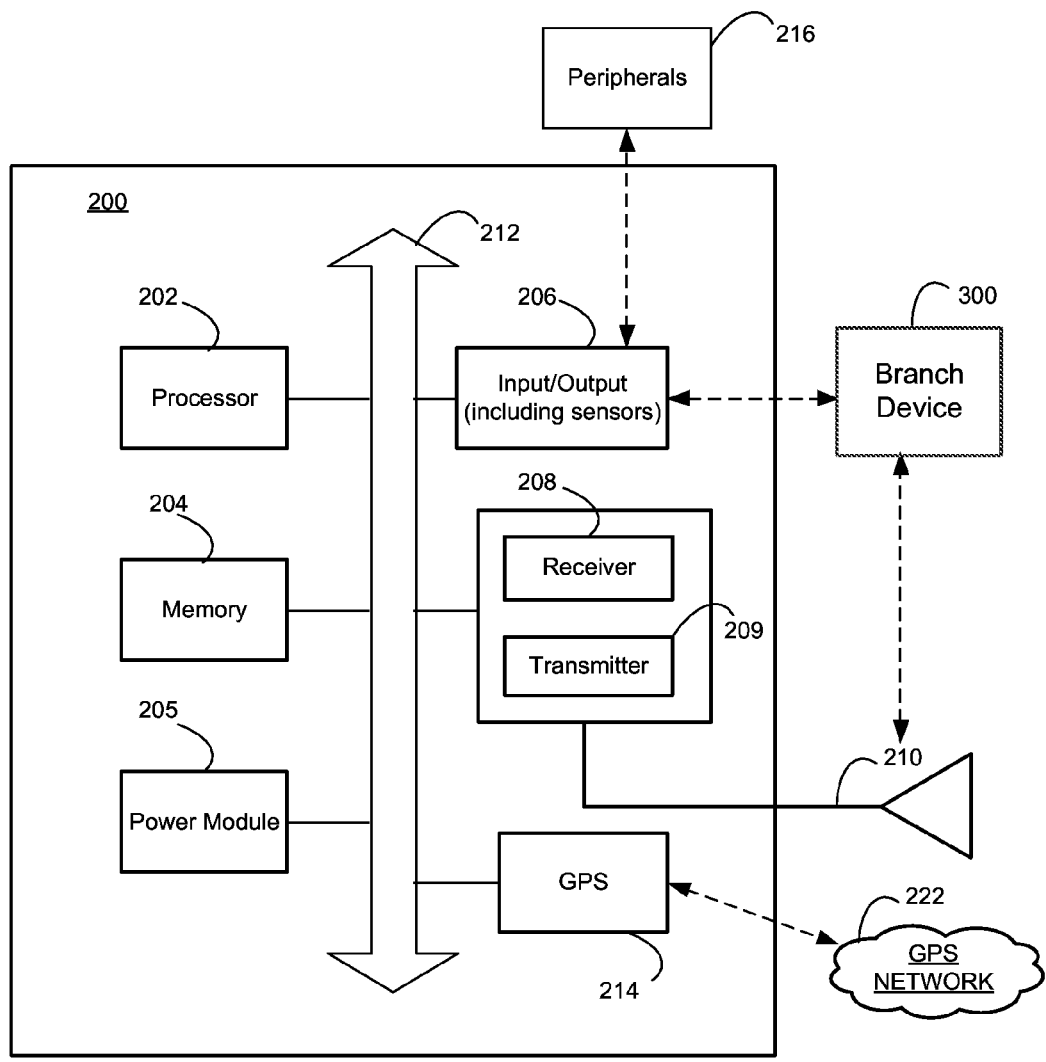
FIG. 2 illustrates a block diagram of an example client device that can implement an aspect of the cloud computing environment of FIG. 1.
Figure 3:
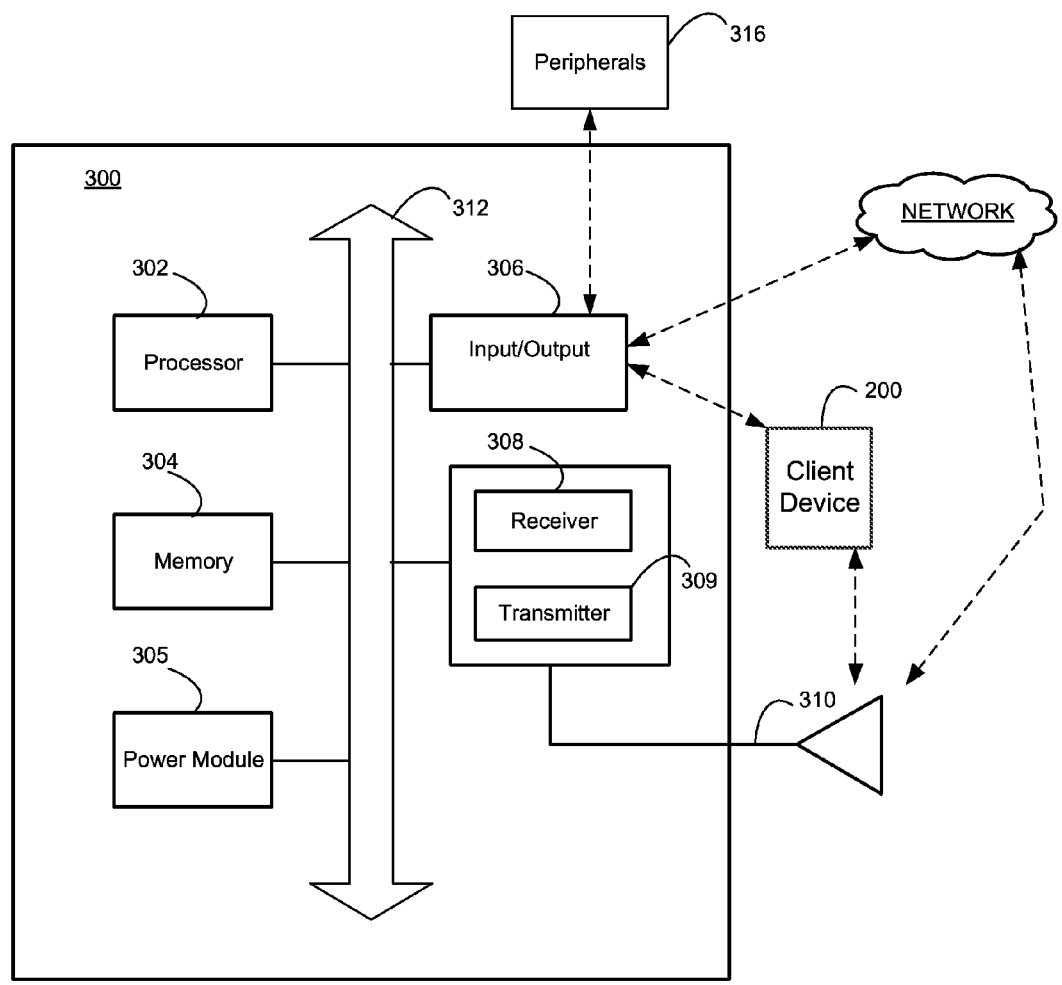
FIG. 3 illustrates a block diagram of an example branch device, such as a branch router, that can implement an aspect of the cloud computing environment of FIG. 1.
Figure 4:
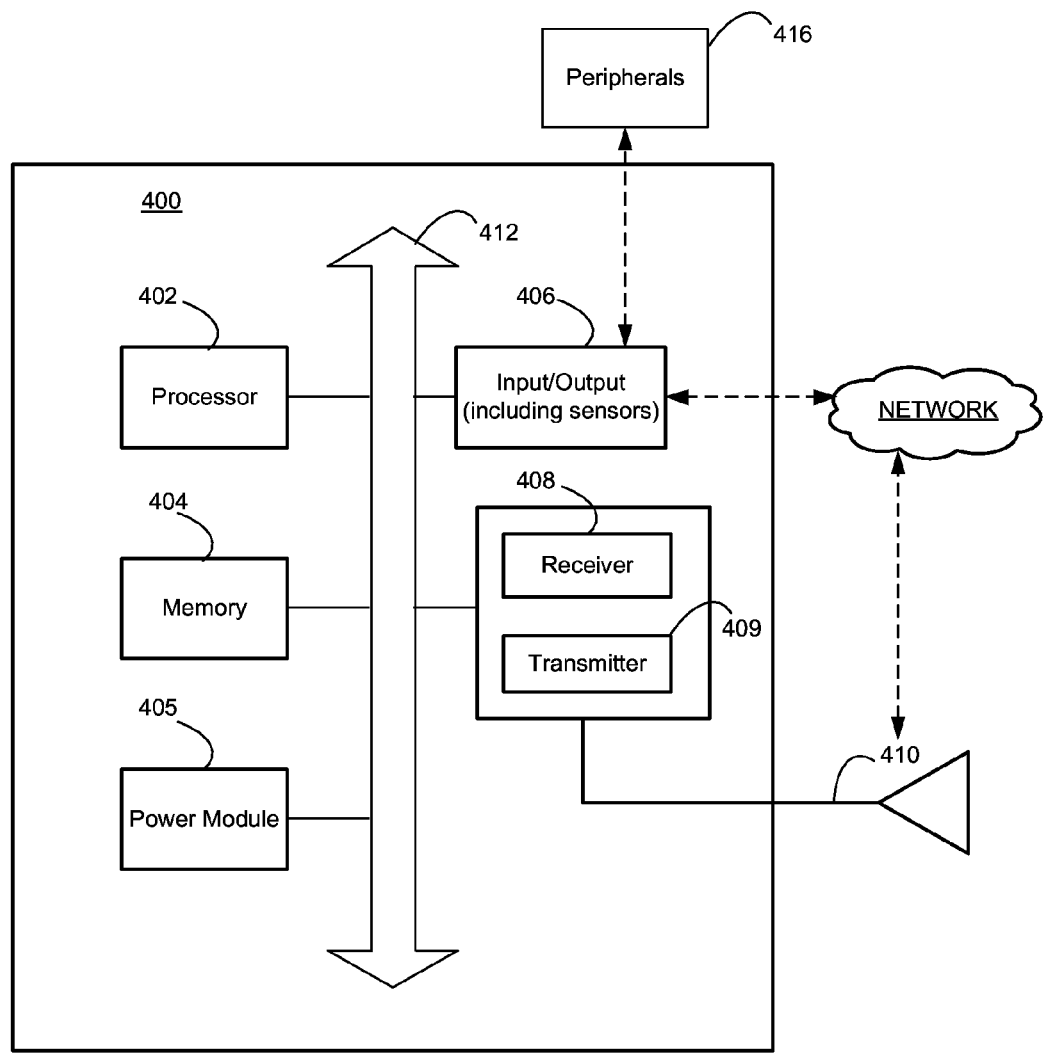
FIG. 4 illustrates a block diagram of an example electronic device, such as a server, that can implement an aspect of the cloud computing environment of FIG. 1.

FIG. 2 illustrates a block diagram of an example client device 200 (such as client device 102) that can implement an aspect of a cloud computing environment, such as the environment 100 of FIG. 1, and aspects of one embodiment of the PBCS. FIG. 3 illustrates a block diagram of an example branch device 300 (such as branch device 104), a branch router, for example, that can implement an aspect of the cloud computing environment of FIG. 1 and aspects of one embodiment of the PBCS. FIG. 4 illustrates a block diagram of an example electronic device 400 (such as servers 105-107, 108 and 110) that can implement an aspect of the cloud computing environment of FIG. 1 and aspects of one embodiment of the PBCS.

Similar components of FIGS. 2-4 are described below. Although the similar components share a common description below, it is to be understood that similar components may vary according to functionalities of the respective devices in which they are included. For example, although there is a common description for processors 202, 302, and 402 of the respective devices 200, 300, and 400, the processors may vary with respect to the respective devices including the processors. For example, the processor 202 of the client device 200 may process data at a slower rate than the processor 402 of the electronic device 400 (which may be a server that stores and processes data and software associated with a cloud computing application, for example). In such a scenario, the client device 200 may render a graphical user interface (GUI) of the cloud computing application, and the processor 202 may use a slower processor than the processor of the server that stores and processes data and instructions associated with the cloud computing application, including the data and instructions for structure and content of the GUI. Typically, there is less data and instructions associated with rendering a GUI than the data and instructions associated with the cloud computing application. Also, in one example scenario, the branch device 300 may include a processor that processes data at a rate slower than the client device 200 or the electronic device 400, since typically a branch device, such as a router, includes an operating system and other applications that are less processor-intensive.

In general, the client device 200, the branch device 300, and the electronic device 400 (which may be a server and a combination of multiple electronic devices), may include, respectively, the processors 202, 302, and 402, memory 204, 304, and 404, power modules 205, 305, and 405, input/outputs 206, 306, and 406 (including input/out signals, sensors, and internal, peripheral, user, and network interfaces), receivers 208, 308, and 408, and transmitters 209, 309, and 409 (or transceivers), antennas 210, 310, and 410 for wireless communications, and communication buses 212, 312, and 412 that connect the aforementioned elements of their respective devices 200, 300, and 400. The client device 200 may also include a global positioning system (GPS) component 214.

The processors 202, 302, and 402 can be one or more of any type of processing device(s), such as a central processing unit (CPU). Also, for example, the processors 202, 302, and 402 can be central processing logic; central processing logic includes hardware, firmware, software or any combination thereof that execute a function of a respective device. Further, central processing logic may include a software controlled microprocessor, discrete logic such as an application specific integrated circuit (ASIC), a programmable or programmed logic device, memory device containing instructions, or logic embodied in hardware, for example. The memory 204, 304, and 404, such as RAM or ROM, can include any type of memory device, such as a device integrated with a processor, or a device separate from a processor. The power modules 205, 305, and 405 may contain one or more power component(s), respectively, and facilitate supply and management of power to their respective devices 200, 300, and 400. The input/outputs 206, 306, and 406, can include any interface for facilitating communication between any components of their respective devices 200, 300, and 400, components of external devices (such as components of other devices of the cloud computing environment 100), and users, including end-users and network administrators. For example, such interfaces can include a network card that is an integration of a receiver, the transmitter, and one or more I/O interface(s). The network card, for example, can facilitate wired or wireless communication with other nodes of the cloud computing environment 100. In cases of wireless communication, the antennas 210, 310, and 410 may also facilitate such communication. Also, the I/O interfaces, can include user interfaces such as monitors, displays, keyboards, keypads, touchscreens, microphones, and speakers. Further, some of the I/O interfaces and the buses 212, 312, and 412 can facilitate communication between components of their respective devices 200, 300, and 400, and in some instances ease processing performed by the respective processors 202, 302, and 402. In other examples of the devices 200, 300, and 400, one or more of the described component(s) may be excluded.

In the case of the client device 200, the device can include a computing device capable of sending or receiving signals, such as via a wired or a wireless network. A client device may include a desktop computer or a portable device, such as a smart phone, a tablet computer, or a laptop computer, for example.

In the case of the branch device 300, the device can include a transceiver capable of sending or receiving signals, such as via a wired or a wireless network. A branch device may be one or more router(s) ranging from a home or small office router to an enterprise router. Also, a branch device may vary in terms of capabilities or features. For example, a home or small office router may pass data, such as web pages and email, between personal computers and a home cable or DSL modem, which connects to the Internet through an Internet Service Provider (ISP). More sophisticated routers, such as enterprise routers, may connect enterprise or ISP networks to core routers that forward data along optical fiber lines. Further, a branch device, such as a branch router, may generate a table listing preferred routes between any two devices in a network, including the client device and another device, such as a server hosting a cloud computing application. A branch device may include interfaces for various physical types of network connections, such as copper cable, fiber optic, or wireless connections. A branch device may also include software, hardware, or firmware for different networking protocol standards. Branch device(s) may also be used to connect two or more logical groups of computer devices known as subnets, where subnets addresses are recorded in the branch device may not necessarily link directly to physical interfaces (such as virtual interfaces via a domain name system (DNS) proxy).

With respect to some routers, a router may have two stages of operation, a control plane and a forwarding plane. In the control plane, a router may record a routing table listing routes that may be used to forward a data packet. The table may also list which physical interface connections are to be used. In one embodiment, the branch device, in the control plane, may include aspects of the PBCS, including aspects mentioned in the description of FIG. 5. In the forwarding plane, a router may communicate data packets between incoming and outgoing interface connections. These packets are forwarded to the correct network type using information contained in a packet header, for example. The information contained in the packet header may be from or derived from the routing table of the control plane.

In the case of the electronic device 400, where the device is a server, the device is capable of sending or receiving signals, such as via a wired or wireless network, and may be capable of processing or storing signals. Devices capable of operating as a server may include dedicated rack-mounted servers, desktop computers, laptop computers, and set top boxes, for example. Further, a server may vary widely in configuration or capabilities. As mentioned above, a server may host a cloud computing application, for example.

Figure 5:
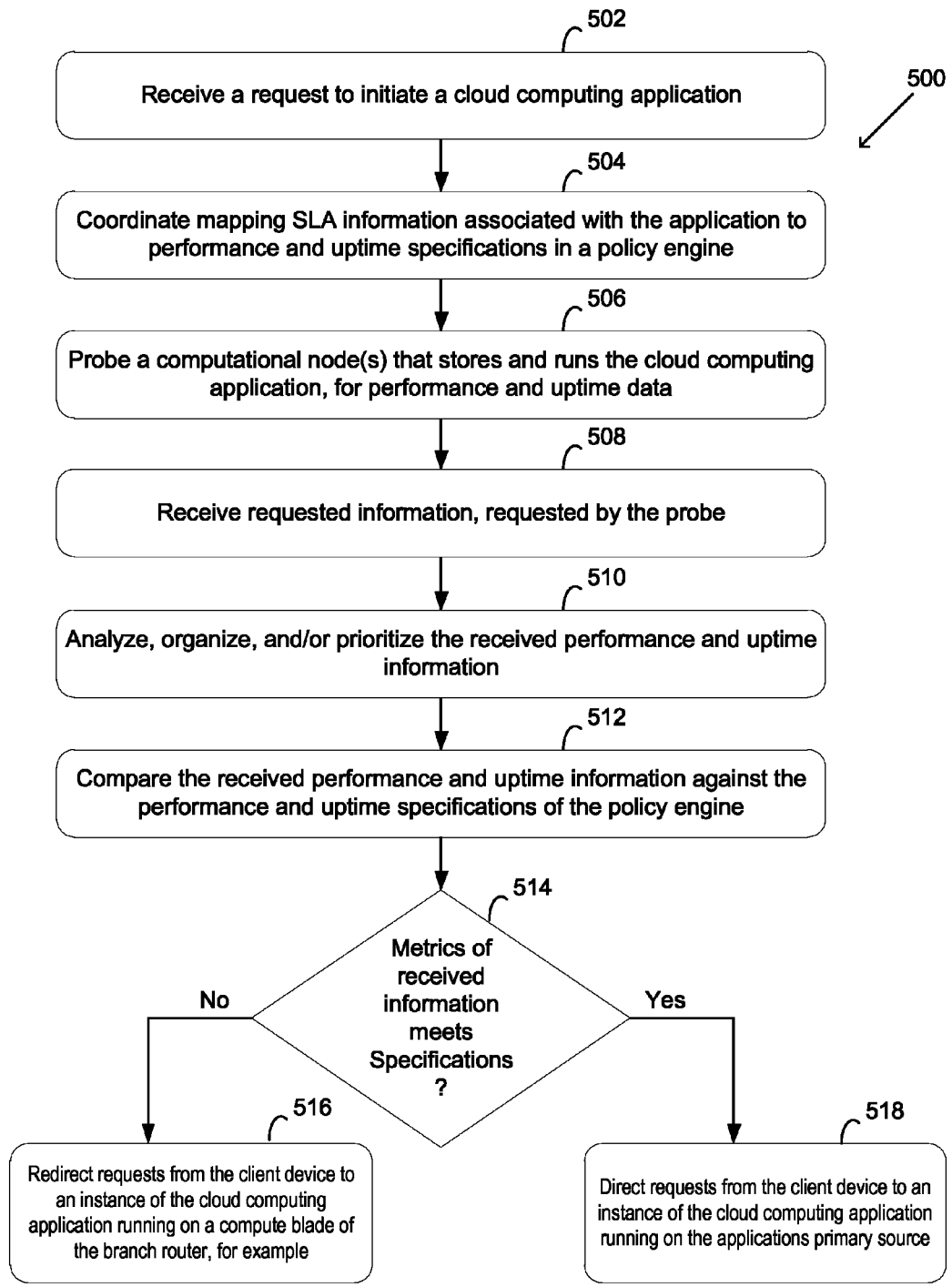
FIG. 5 illustrates a flow chart of an example method for prioritized branch computing performed by the branch device of FIG. 3, for example.

FIG. 5 illustrates a flow chart of an example method 500 for prioritized branch computing performed by a branch device, such as the branch device of FIG. 3, in accordance with certain exemplary embodiments. The processor 302, for example, may perform the method 500 by executing processing device readable instructions encoded in memory, such as the memory 304, which may be in a control plane of a router, for example. The device readable instructions encoded in the memory may include some or all of the aspects of PBCS described herein.

The method 500 starts with a forwarding plane of the branch device receiving a request to initiate access to a cloud computing application (at 502). The cloud computing application may be hosted at any computational node of a network. For example, the cloud computing application may be hosted at a data center and/or application server (such as the server 105, 106, or 107).

The branch device then may coordinate linking SLA information associated with the cloud computing application to performance and uptime specifications in a policy engine (such as the policy engine 100) hosted at any computational node (at 504). The SLA information may originate from a data center hosted on a server (such as servers 105-107) of a cloud computing environment (such as cloud computing environment 100) or any other node the cloud computing environment.

At 506, the branch device then may probe one or more computational node(s) of the cloud computing environment that stores and runs the cloud computing application. For example, a performance manager hosted at a computational node (such as the branch device or another computational node) may communicate a performance and/or uptime probe to the computational node(s) that stores and runs the cloud computing application. In turn, the probe may request performance and/or uptime information from the computational node(s) that stores and runs the cloud computing application; and where available, these computational node(s) may return the requested information to the branch device (such as the control plane of the branch device).

At 508, the branch device may receive, via the forwarding plane and/or its receiver (such as the receiver 308), for example, the requested information from the probe. The request information may include tracked performance (such as tracked latency, jitter, drops, or the like) and uptime between the branch device and the computational node(s) that stores and runs the cloud computing application.

Also, not depicted, as an alternative to or in addition to the probe, the branch device may receive performance data and uptime data with respect the computational node(s) that stores and runs the cloud computing application from a computational node running a cloud service management application (such as the server that includes cloud service management 108). For example, the branch device may receive data center availability metrics from the server 108. The data center availability metrics may include processing rate and storage considerations of various aspects of the cloud computing environment, including metrics regarding switches, routers, servers, and clients devices of the cloud computing environment, for example. Further, the branch device may continually maintain a record of performance and uptime information regarding various aspects of the cloud computing environment; whether the information is derived from the probe or the cloud service management application, for example. The record of performance and uptime may be stored in the memory of the branch device or a node close to the branch device, such as a node in the same branch or LAN.

The branch device then may analyze, organize, and/or prioritize the received performance and uptime information from the probe and/or the cloud service management application (at 510). Not depicted, the processes at 506, 508, and 510 may occur periodically. For example, the processes at 506, 508, and 510 may occur in the background of a running cloud computing application, periodically, at predetermined periods of time (such as per second, minute, or hour).

At 512, the branch device then may compare information from the record of performance and uptime against the performance specifications and the uptime specifications of the policy engine (such as the policy engine of server 110). At 514, from the comparison at 512, the branch device (such as the control plane of a branch router) determines whether metrics from the information from the record satisfies the performance specifications and the uptime specifications. For an end-user using a client device (such as the client device 102) accessing the cloud computing application via the branch device, whose SLA specifications for the cloud computing application cannot be met by the computational node(s) that stores and runs the cloud computing application, the branch device redirects requests from the end user's client device to an instance of the cloud computing application running on a compute blade of the branch device, or another computational node of the cloud computing environment closer to the client device than the computational node(s) that stores and runs the cloud computing application (at 516). Alternatively, the branch device redirects requests of the end user's client device to an instance of the cloud computing application running on another computational node of the cloud computing environment that satisfies the SLA specifications. Where the SLA specifications for the end-user can be met by the computational node(s) that stores and runs the cloud computing application, the branch device directs requests from the client device to the computational node(s) that stores and runs the cloud computing application (at 518).

Also, with respect to the method 500, the branch device may redirect a cloud computing application access request by acting as a DNS Proxy, and by intercepting a DNS request sent by a client for resolving a cloud computing application name. The branch device may insert an appropriate record in a DNS response sent back to client. This this record could point to either a data center or a local device running the cloud computing application. For identifying users, technologies such as 802.1X could be used for both wired and wireless clients. This may allow a branch device to determine which user has sent the DNS request for the cloud computing application. Using a user identification code and the cloud computing application name (in the DNS request), the branch device may look up the performance and uptime specifications associated with a policy engine.

We claim:

1. A method, comprising:
   comparing, by a branch router, performance data and uptime data associated with a first computational node running a first instance of a cloud computing application against performance specifications and uptime specifications associated with a policy engine, the first computational node including a remote server;
   receiving, by the branch router, a request to access the cloud computing application from a client device, the request from the client device received over a local area network;
   directing, by the branch router, the request from the client device over a wide area network to the first instance of the cloud computing application, due to the performance data and the uptime data at least meeting the performance specifications and the uptime specifications; and
   directing, by the branch router, the request from the client device to a second instance of the cloud computing application stored and running on a second computational node included with the branch router, due to the performance data and the uptime data not at least meeting the performance specifications and the uptime specifications.

2. The method of claim 1, further comprising: receiving the request from the client device, prior to the comparing the performance data and the uptime data against the performance specifications and the uptime specifications.

3. The method of claim 2, further comprising: coordinating linking service level agreement (SLA) information associated with the cloud computing application to the performance specifications and the uptime specifications, prior to the comparing the performance data and the uptime data against the performance specifications and the uptime specifications, respectively.

4. The method of claim 3, wherein the coordinating linking occurs subsequent to the receiving the request.

5. The method of claim 1, further comprising: transmitting a request for the performance data and the uptime data to the first computational node, prior to the comparing the performance data and the uptime data against the performance specifications and the uptime specifications.

6. The method of claim 5, further comprising: receiving a response to the request for the performance data and the uptime data from the first computational node.

7. The method of claim 1, wherein a control plane of the branch router performs the comparing the performance data and the uptime data against the performance specifications and the uptime specifications, and wherein a forwarding plane of the branch router performs the directing of the request.

8. The method of claim 1, wherein the performance data comprises jitter levels.

9. The method of claim 1, wherein the first computational node is part of a data center.

10. The method of claim 1, wherein the second computational node is a compute blade of the branch router.

11. The method of claim 1, wherein the first computational node processes data at a faster rate than the second computational node.

12. The method of claim 1, wherein the performance specifications and the uptime specifications are associated with a service level agreement (SLA) for a particular end-user with respect to the cloud computing application, and wherein the SLA comprises performance and uptime terms that correspond to the performance specifications and the uptime specifications.

13. The method of claim 1, wherein the performance specifications and the uptime specifications are associated with a service level agreement (SLA) for a type of end-user with respect to the cloud computing application, and wherein the SLA comprises performance and uptime terms that correspond to the performance specifications and the uptime specifications.

14. A client device, comprising a control device configured to:
   request access to a cloud computing application;
   map service level agreement information associated with the cloud computing application to performance specifications and uptime specifications associated with a policy engine;
   communicate with a first computational node that runs a first instance of the cloud computing application, via a wide area network, wherein the communication with the first computational node comprises:
   a request for performance data and uptime data, from the client device to the first computational node; and
   a response to the request containing the performance data and the uptime data, from the first computational node to the client device;
   compare the performance data and the uptime data against the performance specifications and the uptime specifications;
   direct a request to access the cloud computing application over the wide area network to the first instance of the cloud computing application running on the first computational node, due to the performance data and the uptime data at least meeting the performance specifications and the uptime specifications; and direct the request over a local area network to a second instance of the cloud computing application stored and running at a second computational node of a branch router, due to the performance data and the uptime data not at least meeting the performance specifications and the uptime specifications, the first computational node configured to process data at a faster rate than the second computational node.

15. A router, comprising:

a compute blade, configured to:

run and store local instances of cloud computing applications; and manage routing of requests to the local instances and remote instances of the cloud computing applications by a comparison of performance data and uptime data associated with a processing device of a remote server running a remote instance of a cloud computing application against performance specifications and uptime specifications; and routing circuitry, configured to:

receive a request to access the cloud computing application from a client device, the request communicated over a local area network;

direct the request over a wide area network to the remote instance of the cloud computing application, due to the performance data and the uptime data at least meeting the performance specifications and the uptime specifications; and direct the request to a local instance of the cloud computing application running and stored on the compute blade, due to the performance data and the uptime data not at least meeting the performance specifications and the uptime specifications.

16. The router of claim 15, wherein the routing circuitry is further configured to redirect the request by acting as a DNS Proxy.

17. The router of claim 16, wherein the routing circuitry is further configured to redirect the request by intercepting a DNS request sent by the client device for resolving a name of the cloud computing application.

18. The router of claim 17, wherein the routing circuitry is further configured to insert a record of the name in a DNS response sent back to the client device.

19. The router of claim 18, wherein the record is configured to identify the compute blade.

20. The router of claim 19, wherein the record is configured to identify the remote server.

* * * * *